United States Patent
Nakashima et al.

(10) Patent No.: US 10,086,458 B2
(45) Date of Patent: Oct. 2, 2018

(54) ELECTRICAL DISCHARGE MACHINE OF WHICH AXIS FEEDING PROPERTIES ARE CHANGEABLE

(71) Applicant: FANUC Corporation, Yamanashi (JP)

(72) Inventors: Yasuo Nakashima, Yamanashi (JP); Akiyoshi Kawahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 167 days.

(21) Appl. No.: 15/083,556

(22) Filed: Mar. 29, 2016

(65) Prior Publication Data

US 2016/0288231 A1    Oct. 6, 2016

(30) Foreign Application Priority Data

Mar. 30, 2015  (JP) .................. 2015-069424

(51) Int. Cl.
    *G05B 19/402* (2006.01)
    *B23H 1/00* (2006.01)
    *B23H 7/20* (2006.01)
    *B23H 1/02* (2006.01)
    *B23H 7/26* (2006.01)
(Continued)

(52) U.S. Cl.
CPC .................. *B23H 7/20* (2013.01); *B23H 1/02* (2013.01); *B23H 7/26* (2013.01); *B23H 11/00* (2013.01); *G05B 19/402* (2013.01); *B23H 1/10* (2013.01); *G05B 2219/45221* (2013.01)

(58) Field of Classification Search
CPC ............................. B23H 11/00; G05B 19/402
See application file for complete search history.

(56) References Cited

U.S. PATENT DOCUMENTS 3,885,418 A * 5/1975 Kriebel .................. G01N 11/14
                                              340/603
4,628,170 A * 12/1986 Furukawa ................ B23H 1/10
                                              137/172
(Continued)

FOREIGN PATENT DOCUMENTS

EP         1498207 A1    1/2005
JP       62-271633 A   11/1987
(Continued)

OTHER PUBLICATIONS

Extended European Search Report in EP Application No. 16162226.1, dated Sep. 12, 2016.
(Continued)

*Primary Examiner* — Mark Connolly
(74) *Attorney, Agent, or Firm* — Hauptman Ham, LLP

(57) ABSTRACT

The upper limit value for the axis feeding speed is set to the maximum speed that can secure the safety in a wire electrical discharge machine. In the case where the level of the process liquid is higher than a predetermined height, however, the upper limit value is made smaller. In order to prevent the process liquid from spilling to the outside of the process tank, the acceleration or the jerk may be changed instead of the axis feeding speed. In the case where the process liquid level is high, it is difficult for the process liquid to spill when the speed is adjusted slowly. In addition, the time constant may be increased or the instruction for speed may be changed from the linear type to the S shape type.

10 Claims, 6 Drawing Sheets

(51) Int. Cl.
*B23H 11/00* (2006.01)
*B23H 1/10* (2006.01)

(56) References Cited

U.S. PATENT DOCUMENTS

| | | | | |
|---|---|---|---|---|
| 5,223,688 A | * | 6/1993 | Hosoda | B23H 1/10 137/577 |
| 2004/0193306 A1 | * | 9/2004 | Kurihara | B23H 7/04 700/162 |
| 2004/0262266 A1 | | 12/2004 | Ishiwata et al. | |
| 2009/0152244 A1 | * | 6/2009 | Kita | B23H 1/10 219/69.19 |
| 2014/0284311 A1 | | 9/2014 | Yoshida | |

FOREIGN PATENT DOCUMENTS

| | | | | |
|---|---|---|---|---|
| JP | 4-17021 U | | 2/1992 | |
| JP | H 0417021 | * | 2/1992 | B23H 7/26 |
| JP | 9-253943 A | | 9/1997 | |
| JP | 2001-105242 A | | 4/2001 | |
| JP | 2001105242 A | * | 4/2001 | |
| JP | 2014-180734 A | | 9/2014 | |

OTHER PUBLICATIONS

Office Action in JP Application No. 2015-069424, dated Jun. 6, 2017.

* cited by examiner

Type of adjustable speed: linear type

Type of adjustable speed: S shape type ns to provide
ELECTRICAL DISCHARGE MACHINE OF WHICH AXIS FEEDING PROPERTIES ARE CHANGEABLE

RELATED APPLICATIONS

The present application claims priority to Japanese Patent Application Number 2015-069424, filed Mar. 30, 2015, the disclosure of which is hereby incorporated by reference herein in its entirety.

BACKGROUND OF THE INVENTION

1. Field of the Invention

The present invention relates to an electrical discharge machine for processing a work immersed in a process liquid that is water or oil and that has been stored in a process tank.

2. Description of the Related Art

In a wire electrical discharge machine, a work is processed using the portion of a wire electrode that runs between the upper and lower wire guide units. The wire electrode is guided by a roller that is fixed to the main body of the wire electrical discharge machine so as to be supplied to the wire guide units having a wire guide.

Meanwhile, the worktable on which a work is mounted moves in the X direction and in the Y direction by the instructions from the control unit and in accordance with the state of the work that is being processed. The movements in the X direction and in the Y direction are synthesized while processing progresses vis-à-vis the wire electrode supplied between the wire guide units. The wire electrode repeats the movement according to the servomechanism during the process so that a workpiece is processed to a predetermined form through electrical discharge resulting from the movements of the wire electrode and the workpiece relative to each other.

Japanese Unexamined Patent Publication 2014-180734 discloses a wire electrical discharge machine having a function of determining the state within the process tank. In this wire electrical discharge machine, it is prohibited to turn on the power supply for processing in the case where the process liquid level is lower than a predetermined height. In other words, it is prohibited to turn on the power supply for processing in such a state that a sufficient amount of process liquid has not been stored in the process tank so that an electric shock that is caused by the operator when making contact on the parts of the wire electrode and the work that are being processed or the scattering of the process liquid into the air can be prevented, and thus, the level of safety is increased.

Japanese Unexamined Patent Publication 2001-105242 discloses a process tank unit in an electrical discharge machine. The door lock is released in the case where it has been detected that the process liquid is at a predetermined level or lower by a level detection sensor for detecting the level of the process liquid within the process tank.

FIGS. 1A and 1B show the configuration of an electrical discharge machine. FIG. 1A is a diagram showing the state where there is no process liquid 22 within a process tank 6, and FIG. 1B is a diagram showing the state where a process liquid 22 is stored within the process tank 6.

During the preparation work in the electrical discharge machine, an axis feeding operation is carried out while an indicator is made to make contact with a work 4 after the work 4 has been mounted on a worktable 5 so that the inclination of the work 4 is adjusted (correction of parallelism) and the position of the work 4 is detected (positioning).

In the case of a wire electrical discharge machine, a wire electrode 1 is vertically adjusted. These works are, in many cases, carried out in a state where no process liquid 22 is stored in the process tank 6 as shown in FIG. 1A. Sometimes, however, these works are carried out in a state where the process liquid 22 is stored as shown in FIG. 1B.

It is required to complete the preparation work in as short of time as possible so as to make the actual working hours of the operator as short as possible. In order to do so, it is desirable for the axis feeding of the X axis, the Y axis and the Z axis to be as fast and agile as possible. In particular, this is highly required for large-scale machines having large strokes. Usually, there are several steps of set values for the axis feeding speed, and the operator selects the axis feeding speed. In addition, some machines allow the operator to be able to preset a desired axis feeding speed. However, the set value for the axis feeding speed is fixed.

Such a problem arises that the process liquid 22 undulates and spills from the process tank 6 in the case where an axis feeding operation is carried out when the level of the process liquid 22 stored in the process tank 6 is high. It is possible for the operator to slip on the process liquid 22 when it has been spilt onto the floor. Here, electrical discharge machines include a type where the process tank 6 is movable and a type where the process tank 6 is still but the head unit or the guide unit is movable instead (in some cases they both are movable along different axes). The above-described problem appears mainly with the former type, but not in a small number of cases, the same phenomenon could happen in the latter type due to the occurrence of the flow of the process liquid.

Japanese Unexamined Patent Publication 2014-180734 and Japanese Unexamined Patent Publication 2001-105242 are both examples of the prior art where a certain operation is carried out on the basis of the level of the process liquid. However, neither relates to the axis feeding speed.

SUMMARY OF THE INVENTION

Therefore, an object of the present invention is to provide a wire electrical discharge machine where it is possible to prevent the process liquid from spilling from the process tank to the outside by means of an axis feeding operation.

The electrical discharge machine according to the present invention is for processing a work that is immersed in a process liquid stored in a process tank and is provided with: a liquid level information acquiring unit for acquiring information that becomes an index of the level of the process liquid; and an axis feeding property changing unit for changing the axis feeding properties in accordance with the information acquired by the above-described liquid level information acquiring unit.

The present invention can provide a structure of a wire electrical discharge machine where it is possible to prevent the process liquid from spilling from the process tank to the outside by means of an axis feeding operation.

The information for the index of the above-described process liquid level may include at least one of the process liquid level detected by a liquid level detection unit; the coordinate value along the Z axis of an electrode or a guide for guiding an electrode; the set value for the process liquid level; the set value for the thickness of the work; the instruction for supplying the process liquid; the instruction for discharging the process liquid; the open or closed state of the door; or the load of the motor for driving the axis.

The above-described axis feeding property changing unit may change at least one of the axis feeding speed; the axis feeding acceleration; the axis feeding jerk; the axis feeding adjustable speed time constant; or the type of the axis feeding adjustable speed.

The index of the above-described process liquid level may be the process liquid level detected by a liquid detection unit, and in the case where the process liquid level is higher than a predetermined liquid level, as opposed to the case where the process liquid level is lower than the predetermined liquid level, the above-described axis feeding property changing unit may perform at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level may be the coordinate value along the Z axis, and in the case where the coordinate value along the Z axis is higher than a predetermined height, as opposed to the case where the coordinate value along the Z axis is lower than the predetermined height, the above-described axis feeding property changing unit may perform at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level may be the set value for the process liquid level, and in the case where the set value for the process liquid level is greater than a predetermined value, as opposed to the case where the set value for the process liquid level is smaller than the predetermined value, the above-described axis feeding property changing unit may perform at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level may be the set value for the thickness of the work, and in the case where the set value for the thickness of the work is greater than a predetermined value, as opposed to the case where the set value for the thickness of the work is smaller than the predetermined value, the above-described axis feeding property changing unit may perform at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level may be the instruction for supplying the process liquid to the process tank, and after the liquid supplying instruction, as opposed to before the liquid supplying instruction, the above-described axis feeding property changing unit may perform at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level may be the instruction for discharging the process liquid from the process tank, and after the liquid discharging instruction, as opposed to before the liquid discharging instruction, the above-described axis feeding property changing unit may perform at least one of increasing the absolute value of the axis feeding speed, increasing the absolute value of the axis feeding acceleration, increasing the absolute value of the axis feeding jerk, reducing the axis feeding adjustable speed time constant, or changing the type of the axis feeding adjustable speed.

The index of the above-described process liquid level may be the open or closed state of the door, and when the door is in the open state, as opposed to when the door is in the closed state, the above-described axis feeding property changing unit may perform at least one of increasing the absolute value of the axis feeding speed, increasing the absolute value of the axis feeding acceleration, increasing the absolute value of the axis feeding jerk, reducing the axis feeding adjustable speed time constant, or changing the type of the axis feeding adjustable speed.

The index of the above-described process liquid level may be the load of the motor for driving the axis, and when the load of the motor is greater than a predetermined value, as opposed to when the load of the motor is smaller than the predetermined value, the above-described axis feeding property changing unit may perform at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

BRIEF DESCRIPTION OF THE DRAWINGS

The above-described and other objects as well as the features of the present invention will be clarified from the following descriptions of the embodiments in reference to the accompanying drawings, from among which.

DETAILED DESCRIPTION OF THE PREFERRED EMBODIMENTS

In the following, the preferred embodiments of the present invention are described in reference to the drawings.

Figure 1A:
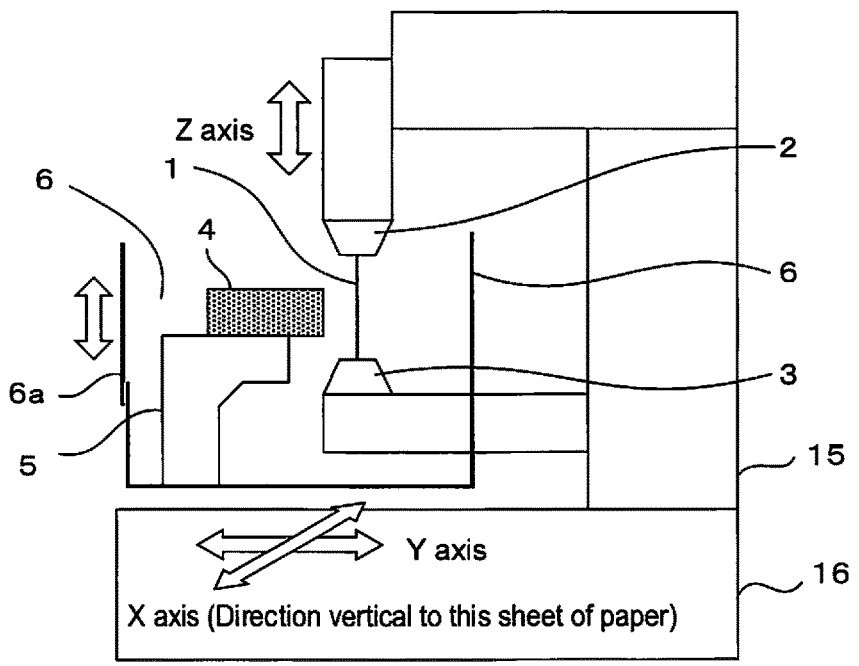
FIG. 1A is a diagram showing the configuration of a wire electrical discharge machine in a state where there is no process liquid in a process tank.
Figure 1B:
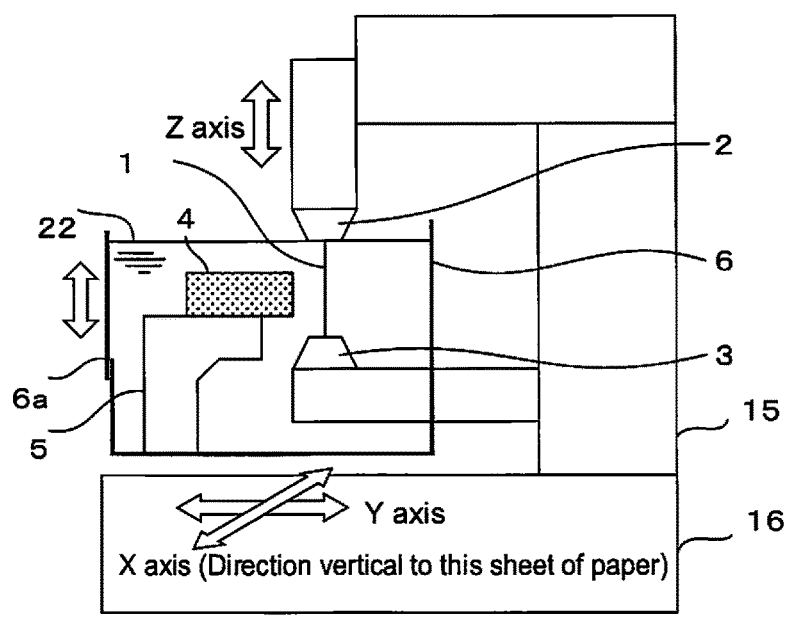
FIG. 1B is a diagram showing the configuration of a wire electrical discharge machine in a state where a process liquid is stored in a process tank.
Figure 2:
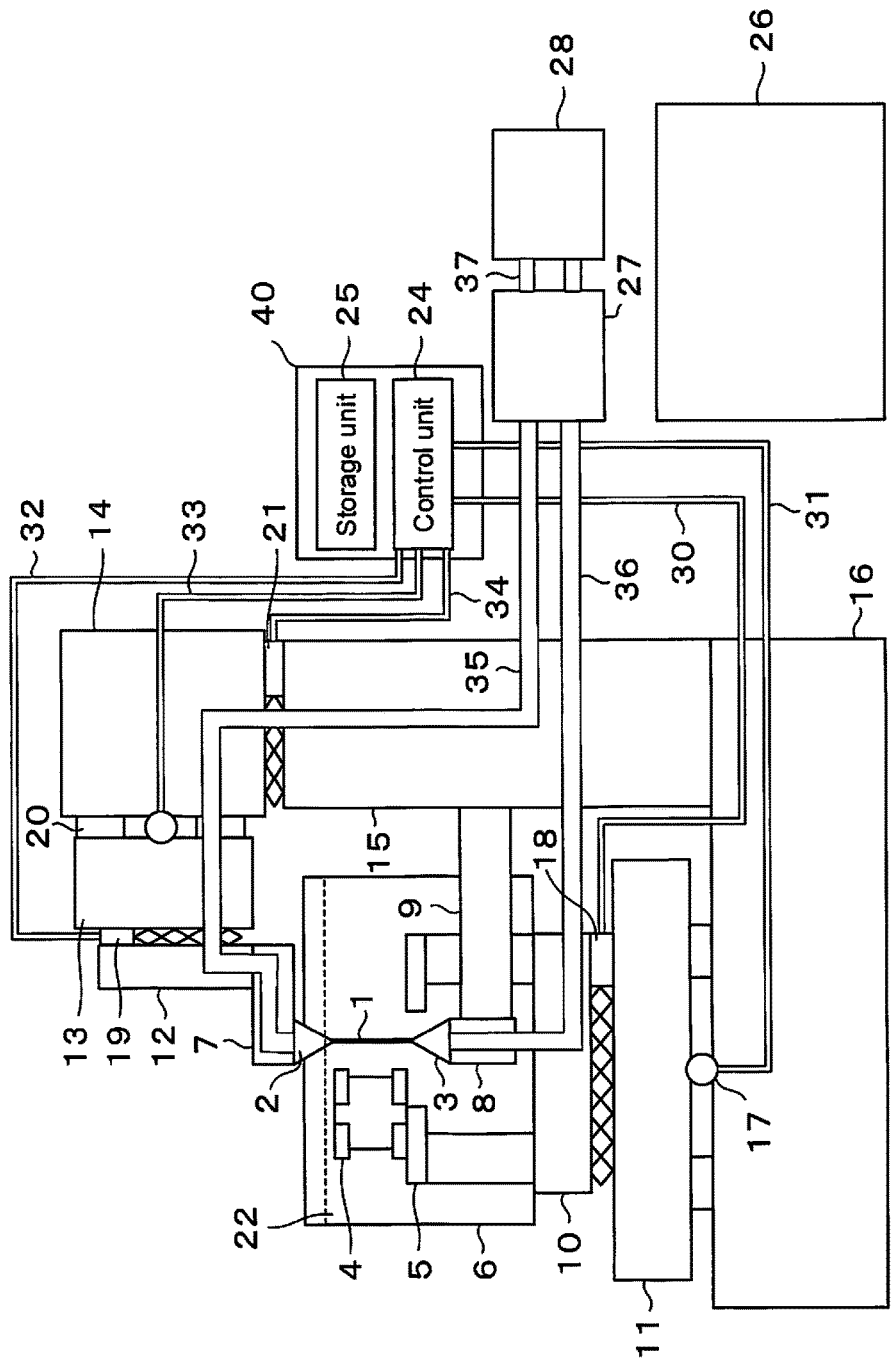
FIG. 2 is a diagram showing the configuration of a wire electrical discharge machine.

FIG. 2 is a diagram showing the configuration of a wire electrical discharge machine. An X-axis saddle 11 is provided on top of a bed 16. A Y-axis saddle 10 is provided on top of the X-axis saddle. A process tank 6 is installed on the Y-axis saddle 10. A worktable 5 on which a work 4 to be processed through electrical discharge is to be mounted is provided within the process tank 6. A process liquid 22 is discharged into a wastewater tank 26 from the process tank 6 through a pipeline, not shown. The process liquid 22 that has been discharged from the process tank 6 to the wastewater tank 26 includes debris created through the electrical discharge process, and therefore is moved to a clear water tank 27 through a filter, not shown. A process liquid temperature adjusting unit 28 is installed in the clear water tank 27 so that the process liquid in the clear water tank 27 circulates through the process liquid temperature adjusting unit 28 via a pipeline 37, and thus, the process liquid temperature adjusting unit 28 adjusts the temperature of the process liquid. After that, the process liquid in the clear water tank 27 is again fed into the process tank 6 via pipelines 35 and 36. Here, the pumps, such as the ones for feeding the process liquid 22 to the process tank 6 from the clear water tank 27, are not shown.

The positional relationship between a wire electrode 1 and a work 4 changes when the motor for each axis is driven by a control unit 24 in a control unit 40. An X-axis drive motor 17 that is controlled by the control unit 24 via an X-axis drive motor signal line 31 drives the X-axis saddle 11, and a Y-axis drive motor 18 that is controlled by the control unit 24 via a Y-axis drive motor signal line 30 drives the Y-axis saddle 10 so that the wire electrode 1 and the work 4 are positioned relative to each other in the X-Y directions.

A U-axis drive motor 20 that is controlled by the control unit 24 via a U-axis drive motor signal line 33 drives a U-axis saddle 13, and a V-axis drive motor 21 that is controlled by the control unit 24 via a V-axis drive motor signal line 34 moves a V-axis saddle 14 so that an upper head unit 7 is moved in the location in the U-V directions, and the position is set for the inclination of the wire electrode 1.

A Z-axis drive motor 19 that is controlled by the control unit 24 via a Z-axis drive motor signal line 32 sets the location along the height of the upper head unit 7 that is attached to a Z-axis saddle 12. The position detector that is incorporated in the drive motor 17, 18, 19, 20 or 21 for each axis positions the wire electrode 1 while detecting the position thereof.

An upper guide 2 in the upper head unit 7 is provided with an upper nozzle for jetting the process liquid 22. A lower guide 3 in a lower head unit 8 is provided with a lower nozzle for jetting the process liquid 22. The lower head unit 8 is fixed to a lower arm 9, and the lower arm 9 is attached to the side of a column 15. The control unit 40 of the wire electrical discharge machine applies a voltage between the work 4 and the wire electrode 1 that is stretched between the upper guide 2 attached to the upper head unit 7 and the lower guide 3 attached to the lower head unit 8 so as to carry out an electrical discharge process while moving the wire electrode 1 and the work 4 relative to each other.

Attention is paid to the fact that the preparation work is, in many cases, carried out in the state where no process liquid is stored or the level of the process liquid is low in the above-described wire electrical discharge machine. Though the upper limit value for the axis feeding speed is set to the maximum speed that can secure the safety, the upper limit value is made smaller in the case where the level of the process liquid 22 is higher than a predetermined height within the process tank 6. The level of the process liquid may be directly detected by a sensor or the physical quantity that is specified in accordance with one of the following methods may be used, which is sufficient when taking into consideration the fact that the precision with the detection of the liquid level needs not to be high in order to achieve the present object.

The coordinate value along the Z axis (In the case where the values are high along the Z axis, it is determined that the process liquid level is high within the process tank 6 because a thick work is to be processed), where the upper guide 2 moves in the direction along the Z axis.

The set value for the process liquid level (In the case where this is large, it is determined that the process liquid level is high within the process tank 6).

The set value for the thickness of the work (In the case where this is large, it is determined that the process liquid level is high within the process tank 6).

The instruction for supplying the process liquid (The instruction for supplying the process liquid 22 to the process tank 6. It can be determined that the process liquid level is high within the process tank 6 after the liquid has been supplied).

The instruction for discharging the process liquid (The instruction for discharging the process liquid 22 to the wastewater tank 26 from the process tank 6. It can be determined that the process liquid level is low within the process tank 6 after the liquid has been discharged).

The open or closed state of the process tank door (When the process tank door 6a is open, the process liquid 22 cannot be stored within the process tank 6, and therefore, it is determined that the process liquid level is low).

The motor load (In the case where the motor load is light, it is determined that the process liquid level is low within the process tank 6. This is because the resistance of the process liquid to the drive of the axis is small).

Figure 3:
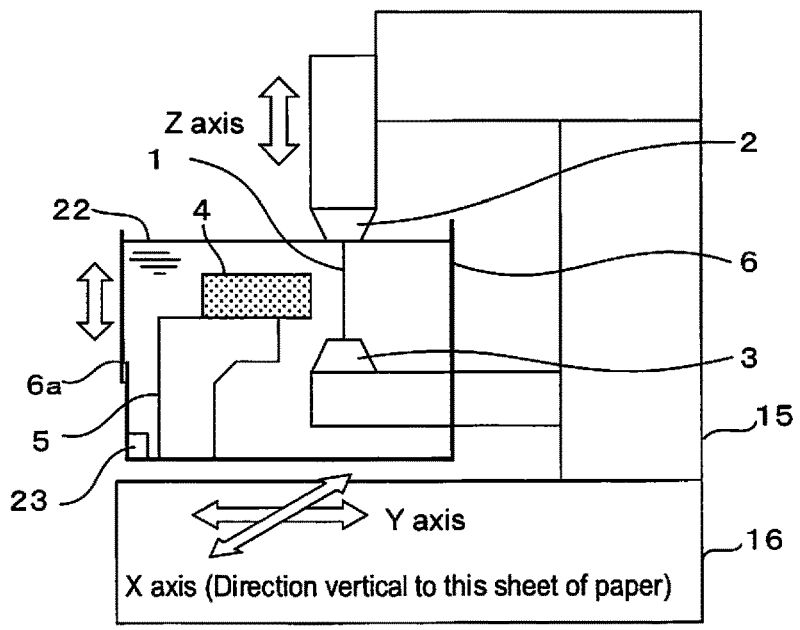
FIG. 3 is a diagram showing the first embodiment of the present invention.
Figure 4:
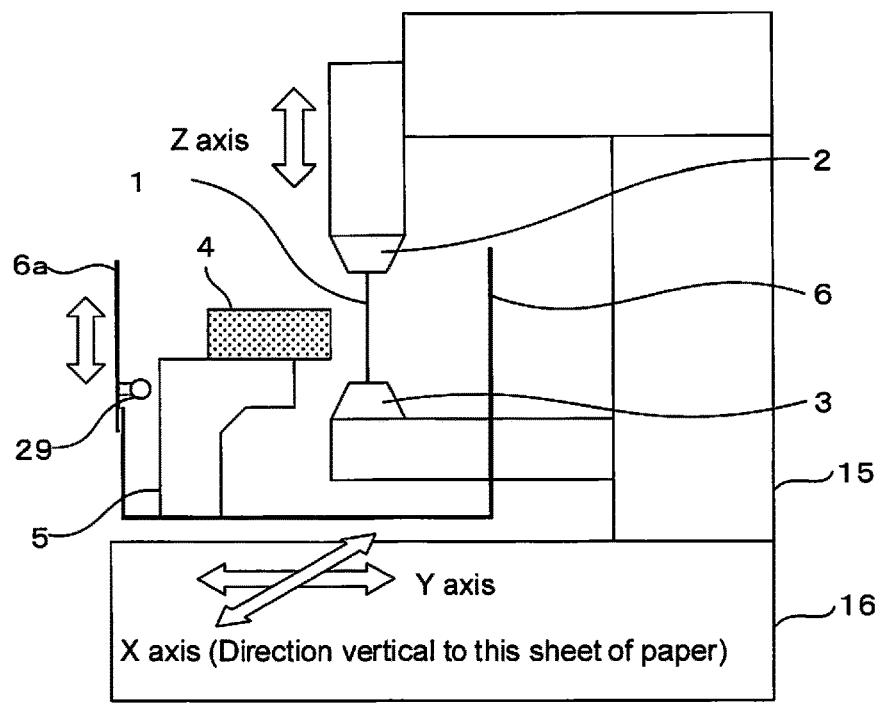
FIG. 4 is a diagram showing the second embodiment of the present invention.

FIG. 3 is a diagram showing one embodiment of the present invention. A liquid level sensor 23 is provided within the process tank 6, and the axis feeding speed is reduced in the case where the level of the process liquid 22 exceeds a predetermined height. FIG. 4 is a diagram showing another embodiment of the present invention. The process tank 6 has a manually operated or automated door, and the door is provided with a limit switch 29 for detecting the open or closed state of the door. In the state where the process tank door 6a is open, the axis feeding speed is made smaller than in the case where the process tank door 6a is closed.

Figure 5A:
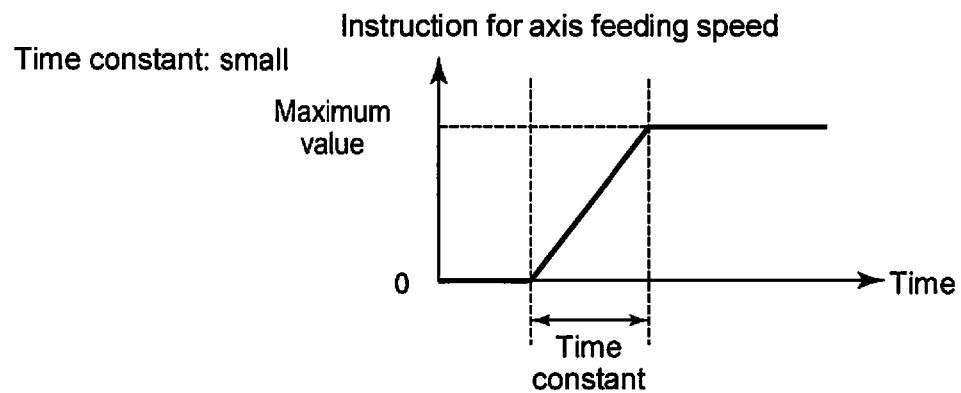
FIG. 5A is a graph showing an example of a speed wave in the case where the time constant is small.
Figure 5B:
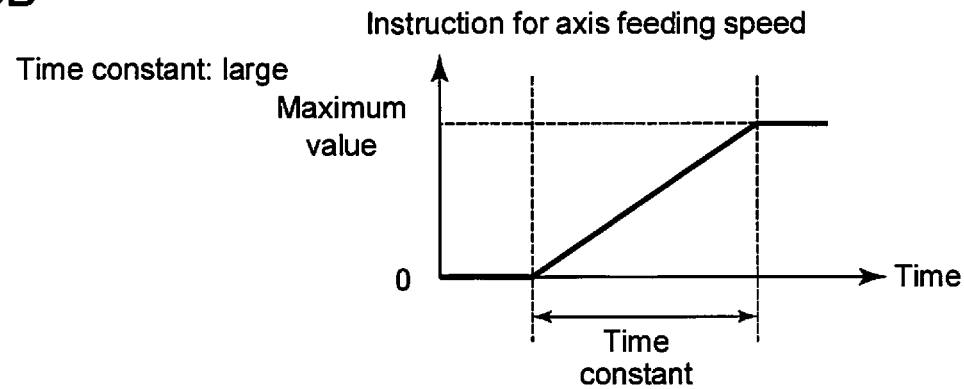
FIG. 5B is a graph showing an example of a speed wave in the case where the time constant is large.
Figure 6A:
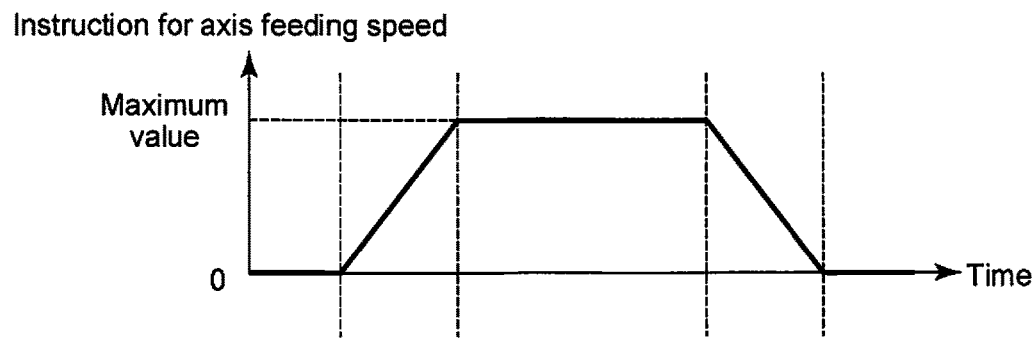
FIG. 6A is a graph showing an example of a speed wave in the case where the adjustable speed is of a linear type.
Figure 6B:
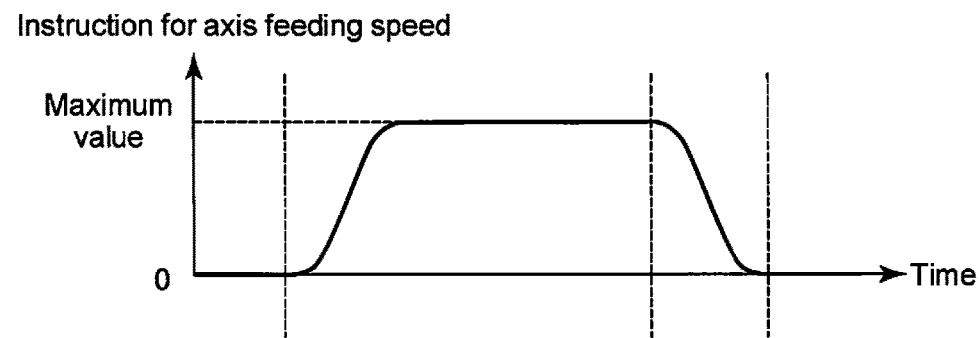
FIG. 6B is a graph showing an example of a speed wave in the case where the adjustable speed is of an S shape type.

In order to prevent the process liquid 22 from spilling from the process tank 6, the acceleration or the jerk may be changed instead of the axis feeding speed. In the case where the process liquid level is high, it is difficult for the process liquid 22 to spill when the speed is adjusted slowly. In addition, the time constant may be increased in order to slow the operation (see FIGS. 5A and 5B). The instruction for the speed may be changed from the linear type to the S shape type, which is also effective (see FIGS. 6A and 6B).

Figure 7:
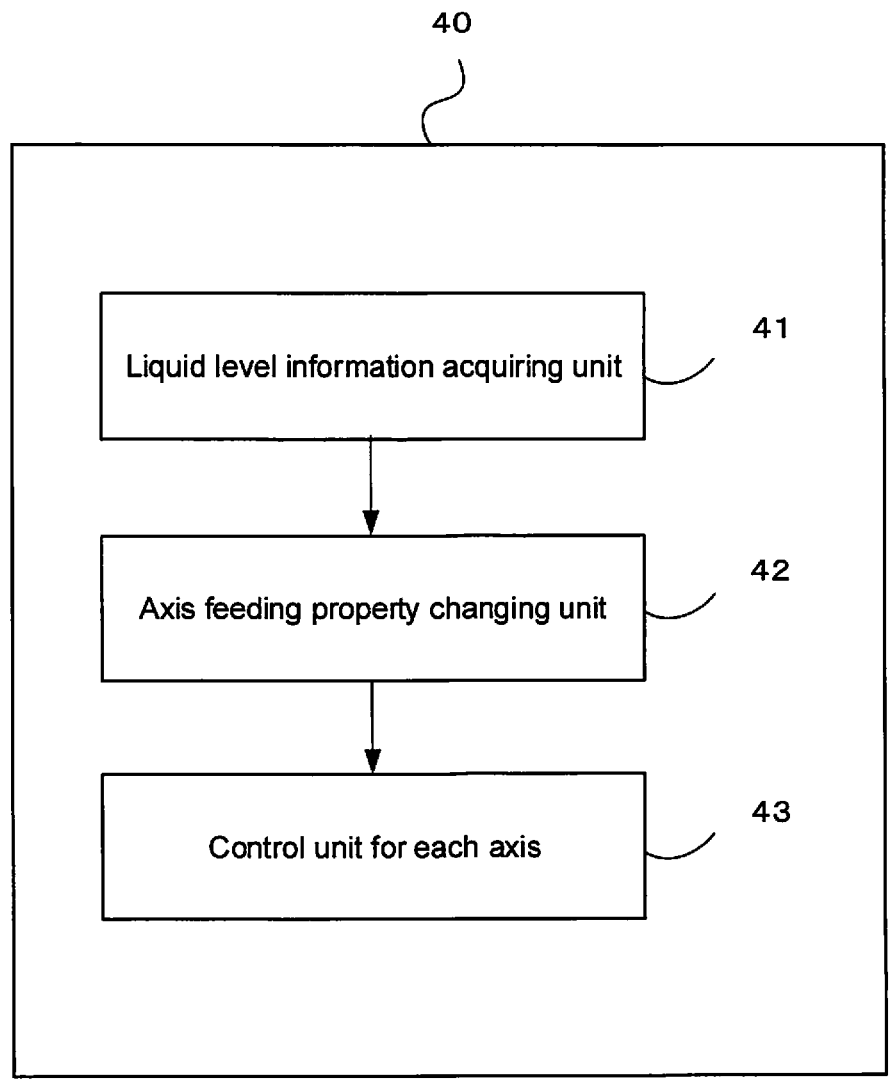
FIG. 7 is a block diagram showing the functions of the control unit of the wire electrical discharge machine wherein the control according to the present invention is carried out.

FIG. 7 is a block diagram showing the functions of the control unit of the wire electrical discharge machine wherein the control according to the present invention is carried out. As shown in FIG. 2, the control unit 40 controls the electrical discharge machine for processing the work 4 immersed in the process liquid 22 that has been stored in the process tank 6. The control unit 40 is provided with a liquid level information acquiring unit 41 for acquiring information that becomes an index of the process liquid level, an axis feeding property changing unit 42 for changing the axis feeding properties in accordance with the information acquired by the above-described liquid level information acquiring unit 41, and a control unit 43 for each axis into which an instruction for changing the axis feeding properties is inputted from the above-described property changing unit 42 and which changes the axis feeding properties. The liquid level information acquiring unit 41 can acquire the liquid level information in the following manner.

The above-described information for the index of the process liquid level characteristically includes at least one of the process liquid level detected by the liquid level detection unit; the coordinate value along the Z axis of the electrode or the guide for guiding the electrode; the set value for the process liquid level; the set value for the thickness of the work; the instruction for supplying the process liquid; the instruction for discharging the process liquid; the open or closed state of the door; or the load of the motor for driving the axis.

The index of the above-described process liquid level is the process liquid level detected by a liquid detection unit, and in the case where the process liquid level is higher than a predetermined liquid level, as opposed to the case where the process liquid level is lower than the predetermined liquid level, the above-described axis feeding property changing unit performs at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level is the coordinate value along the Z axis, and in the case where the coordinate value along the Z axis is higher than a predetermined height, as opposed to the case where the coordinate value along the Z axis is lower than the predetermined height, the above-described axis feeding property changing unit performs at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level is the set value for the process liquid level, and in the case where the set value for the process liquid level is greater than a predetermined value, as opposed to the case where the set value for the process liquid level is smaller than the predetermined value, the above-described axis feeding property changing unit performs at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level is the set value for the thickness of the work, and in the case where the set value for the thickness of the work is greater than a predetermined value, as opposed to the case where the set value for the thickness of the work is smaller than the predetermined value, the above-described axis feeding property changing unit performs at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level is the instruction for supplying the process liquid to the process tank, and after the liquid supplying instruction, as opposed to before the liquid supplying instruction, the above-described axis feeding property changing unit performs at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

The index of the above-described process liquid level is the instruction for discharging the process liquid from the process tank, and after the liquid discharging instruction, as opposed to before the liquid discharging instruction, the above-described axis feeding property changing unit performs at least one of increasing the absolute value of the axis feeding speed, increasing the absolute value of the axis feeding acceleration, increasing the absolute value of the axis feeding jerk, reducing the axis feeding adjustable speed time constant, or changing the type of the axis feeding adjustable speed.

The index of the above-described process liquid level is the open or closed state of the door, and when the door is in the open state, as opposed to when the door is in the closed state, the above-described axis feeding property changing unit performs at least one of increasing the absolute value of the axis feeding speed, increasing the absolute value of the axis feeding acceleration, increasing the absolute value of the axis feeding jerk, reducing the axis feeding adjustable speed time constant, or changing the type of the axis feeding adjustable speed.

The index of the above-described process liquid level is the load of the motor for driving the axis, and when the load of the motor is greater than a predetermined value, as opposed to when the load of the motor is smaller than the predetermined value, the above-described axis feeding property changing unit performs at least one of reducing the absolute value of the axis feeding speed, reducing the absolute value of the axis feeding acceleration, reducing the absolute value of the axis feeding jerk, increasing the axis feeding adjustable speed time constant, or changing the type of the axis feeding adjustable speed.

In addition, the axis feeding property changing unit 42 changes at least one of the axis feeding speed; the axis feeding acceleration; the axis feeding jerk; the axis feeding adjustable speed time constant; or the type of the axis feeding adjustable speed.

Though the embodiments of the present invention are described above, the present invention is not limited to these embodiments and can also be implemented with other modes resulting from the application of an appropriate modification.

The invention claimed is:

1. An electrical discharge machine for processing a workpiece immersed in a process liquid, the electrical discharge machine comprising:
   a process tank for storing the process liquid into which the workpiece is to be immersed;
   an electrode configured to perform a processing of the workpiece;
   an axis configured to move the electrode and the workpiece relatively to each other; and
   a controller configured to
      acquire information that becomes an index of a process liquid level of the process liquid in the process tank; and
      change axis feeding properties of the axis in accordance with the acquired information,
   wherein the controller is further configured to change the axis feeding properties when the liquid level is determined as being above a level at which the process liquid does not spill from the process tank when a door of the process tank is in an open state.

2. The electrical discharge machine according to claim 1, wherein the index of said process liquid level includes at least one of:
the process liquid level detected by a liquid level sensor;
a coordinate value, along a Z axis, of the electrode or a guide for guiding the electrode;
a set value for the process liquid level;
a set value for a thickness of the workpiece;
an instruction for supplying the process liquid to the process tank;
an instruction for discharging the process liquid from the process tank;
the open state or a closed state of the door; or
a load of a motor for driving the axis.

3. The electrical discharge machine according to claim 1, wherein said controller is configured to change the axis feeding properties including at least one of:
an axis feeding speed of the axis;
an axis feeding acceleration of the axis;
an axis feeding jerk of the axis;
an axis feeding adjustable speed time constant of the axis; or
a type of an axis feeding adjustable speed of the axis.

4. The electrical discharge machine according to claim 1, wherein
the index of said process liquid level is the process liquid level detected by a liquid level sensor, and
in the case where the process liquid level is higher than a predetermined liquid level, as opposed to the case where the process liquid level is lower than the predetermined liquid level, said controller is configured to perform at least one of:
reducing an absolute value of an axis feeding speed of the axis,
reducing an absolute value of an axis feeding acceleration of the axis,
reducing an absolute value of an axis feeding jerk of the axis,
increasing an axis feeding adjustable speed time constant of the axis, or
changing a type of an axis feeding adjustable speed of the axis.

5. The electrical discharge machine according to claim 1, wherein
the index of said process liquid level is a coordinate value, along a Z axis, of the electrode or a guide for guiding the electrode, and
in the case where the coordinate value along the Z axis is higher than a predetermined height, as opposed to the case where the coordinate value along the Z axis is lower than the predetermined height, said controller is configured to perform at least one of:
reducing an absolute value of an axis feeding speed of the axis,
reducing an absolute value of an axis feeding acceleration of the axis,
reducing an absolute value of an axis feeding jerk of the axis,
increasing an axis feeding adjustable speed time constant of the axis, or changing a type of an axis feeding adjustable speed of the axis.

6. The electrical discharge machine according to claim 1, wherein
the index of said process liquid level is a set value for the process liquid level, and
in the case where the set value for the process liquid level is greater than a predetermined value, as opposed to the case where the set value for the process liquid level is smaller than the predetermined value, said controller is configured to perform at least one of:
reducing an absolute value of an axis feeding speed of the axis,
reducing an absolute value of an axis feeding acceleration of the axis,
reducing an absolute value of an axis feeding jerk of the axis,
increasing an axis feeding adjustable speed time constant of the axis, or changing a type of an axis feeding adjustable speed of the axis.

7. The electrical discharge machine according to claim 1, wherein
the index of said process liquid level is a set value for a thickness of the workpiece, and
in the case where the set value for the thickness of the workpiece is greater than a predetermined value, as opposed to the case where the set value for the thickness of the workpiece is smaller than the predetermined value, said controller is configured to perform at least one of:
reducing an absolute value of an axis feeding speed of the axis,
reducing an absolute value of an axis feeding acceleration of the axis,
reducing an absolute value of an axis feeding jerk of the axis,
increasing an axis feeding adjustable speed time constant of the axis, or changing a type of an axis feeding adjustable speed of the axis.

8. The electrical discharge machine according to claim 1, wherein
the index of said process liquid level is an instruction for supplying the process liquid to the process tank, and
after the liquid supplying instruction, as opposed to before the liquid supplying instruction, said controller is configured to perform at least one of:
reducing an absolute value of an axis feeding speed of the axis,
reducing an absolute value of an axis feeding acceleration of the axis,
reducing an absolute value of an axis feeding jerk of the axis,
increasing an axis feeding adjustable speed time constant of the axis, or changing a type of an axis feeding adjustable speed of the axis.

9. The electrical discharge machine according to claim 1, wherein
the index of said process liquid level is an instruction for discharging the process liquid from the process tank, and
after the liquid discharging instruction, as opposed to before the liquid discharging instruction, said controller is configured to perform at least one of:
reducing an absolute value of an axis feeding speed of the axis,
reducing an absolute value of an axis feeding acceleration of the axis,
reducing an absolute value of an axis feeding jerk of the axis,
increasing an axis feeding adjustable speed time constant of the axis, or changing a type of an axis feeding adjustable speed of the axis.

10. The electrical discharge machine according to claim 1, wherein
  the index of said process liquid level is the open state or a closed state of the door, and
  when the door is in the open state, as opposed to when the door is in the closed state, said controller is configured to perform at least one of:
    reducing an absolute value of an axis feeding speed of the axis,
    reducing an absolute value of an axis feeding acceleration of the axis,
    reducing an absolute value of an axis feeding jerk of the axis,
    increasing an axis feeding adjustable speed time constant of the axis, or changing a type of an axis feeding adjustable speed of the axis.

* * * * *